March 13, 1956  R. R. IBEY  2,738,204
CABLE CINCH FOR VEHICLE LOAD BINDER
Filed Oct. 18, 1952
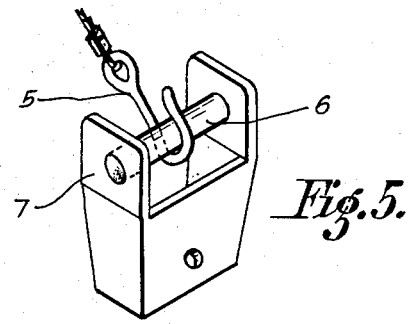
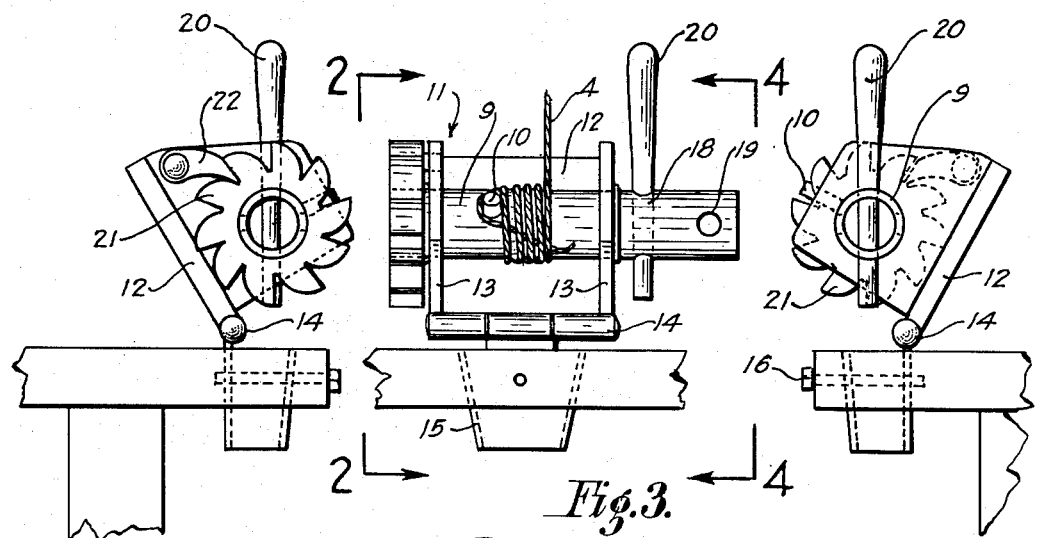
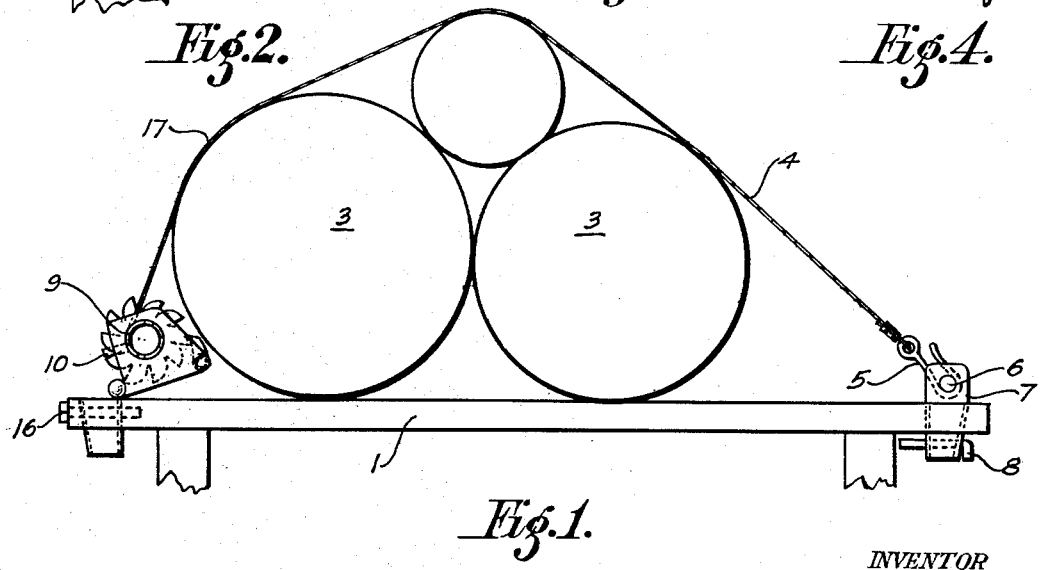
INVENTOR
Robert R. Ibey
BY
A. Schapp
ATTORNEY

United States Patent Office 2,738,204
Patented Mar. 13, 1956

2,738,204

CABLE CINCH FOR VEHICLE LOAD BINDER

Robert R. Ibey, Oakland, Calif.

Application October 18, 1952, Serial No. 315,503

3 Claims. (Cl. 280—179)

The present invention relates to improvements in a cable cinch, and its principal object is to provide a cinch of the character described adapted for use in connection with a truck bed or floor to secure a load upon the latter.

Loads disposed on truck bodies may be of altogether different characteristics. They may be of very great height and fit substantially square upon the truck bed, as in the case of a load of boxes, or they may be of intermediate height, as in a load of lumber, or again they may be very low in height, for instance, in the case of metal pipe and metal frame members.

It is proposed in the present invention to provide a cable cinch which will readily adapt itself to different kinds of loads, and in which a winch drum employed for tightening the cable upon the load is made to automatically assume a position in the line of draft, regardless of the shape of the load.

In carrying out my invention, it is proposed to utilize the stake holes normally provided along the side edges of a truck bed, and to use a stake engageable in one of these holes as an anchoring means for the winch structure.

It is further proposed to hinge the winch structure with respect to the stake in such a manner that the winch structure may swing through an angle of approximately 90°.

Further objects and advantages of my invention will appear as the specification proceeds, and the new and novel features of my cinch will be fully defined in the claims attached hereto.

The preferred form of my invention is illustrated in the accompanying drawing, forming part of this application, in which:

Figure 1 shows an end view of a truck bed having a load thereon, and my cable cinch applied thereto;

Figure 2, an enlarged detail view of my winch structure, as seen from line 2—2 of Figure 3;

Figure 3, a side view of the winch structure;

Figure 4, another end view of the same, as seen from line 4—4 of Figure 3; and

Figure 5, a perspective detail view disclosing an anchoring means for the free end of the cable.

While I have shown only the preferred form of my invention, it should be understood that various changes or modifications may be made within the scope of the claims attached hereto, without departing from the spirit of the invention.

Referring to the drawing in detail, the bed of the truck is illustrated at 1, and is provided, along the side edges thereof, with a plurality of stake holes, indicated at 2. The truck bed may have a load thereon, as indicated at 3, and the load is held in place by means of the cable 4.

One end of the cable may be provided with a hook 5 adapted for engaging over a pin 6 held in a stake 7 inserted in one of the holes 2, and anchored by means of a pin 8.

The other end of the cable is wound upon a winch drum 9, which latter is provided with an anchoring pin 10, and is revolvable in the frame structure generally indicated at 11.

The frame structure 11 comprises a flat bottom plate 12 and two vertical flanges 13 rising therefrom. One edge of the bottom plate 12 is hinged at 14 to the upper edge of a stake 15, which latter is insertible into any one of the stake holes provided along the edge of the bed of the truck, and may be anchored in position by means of a horizontal pin 16 extending through registering holes in the stake and the walls of the stake holes.

It will be noted from the various figures that the stakes are preferably made hollow, rectangular in cross-section, and so as to taper from top to bottom for an easy riding fit in the stake holes of different sizes.

It should further be noted that the hinge 14 is mounted over the inner edge of the stake so as to allow the plate 12 to come down substantially flat on the bed of the truck and to rise from that position to any desired angle, so as to cause the entire winch assembly to automatically bring the winch drum 9 into the line of draft between the hinge 14 and the nearest load-contact point, indicated at 17.

The winch drum 9 projects beyond the flanges 13 on both sides of the frame structure, and one of the projecting ends is formed with suitable apertures 18 and 19 to receive a handle 20 for manipulating the winch drum, while the other end of the winch drum carries a ratchet 21 cooperable with a pawl 22 for holding the drum against reverse motion.

The operation of my invention will be readily understood from the foregoing description:

The hook 5 of the cable may be secured upon one side of the truck bed in any suitable manner, as by means of the pin 6. The cable is then guided over the load and its free end is partly wound upon the drum 9, with the pin 10 serving as an anchoring means. When the cable has become taut, the handle 20 is applied for cinching the cable upon the load, and the pawl and ratchet arrangement will hold the end of the cable against reverse movement.

As soon as pressure is applied to the cable, the winch structure will automatically assume an angle of incline, which brings the drum 9 into the line of draft between the hinge 14 and the nearest point of contact with the load, indicated at 17.

I claim:

1. In combination, a truck floor adapted for holding a load thereon, a stake mounted at one side thereof and having a pivot disposed horizontally and immediately above the level of the floor, a plate having one end hinged to the pivot and being free to swing from a horizontal position above and adjacent to the floor level to a desired angular position, a pair of flanges rising from the plate at right angles to said pivot and adjacent thereto, a winch drum revolvable between the flanges above the plate on an axis running parallel to the axis of the pivot, a cable, means for securing one end of the cable to the side of the floor opposite the stake with the body portion of the cable lying over the load and means for securing the other end of the cable upon the winch drum for winding operations to tighten the cable upon the load, the cable having unobstructed access to the winch drum and the pivot allowing the traction face of the winch drum to automatically orient itself within the line of draft.

2. In combination, a flat, rectangular plate, a straight pivot supporting one end of the plate on a horizontal axis, a pair of flanges rising from the plate at right angles to said horizontal axis and immediately adjacent to the pivot, a winch drum revolvable in the flanges above the plate and mounted parallel to the axis, a cable having one end anchored at a point spaced from the pivot and being guided over a load and having its other end fixed to the winch drum for tightening operations, the cable being made to approach the winch drum from a direction opposite the hinge and having free access to the winch so as to allow the winch drum to freely swing between the pivot and the cable and to orient its traction surface in alinement with the pivot and the cable.

3. In combination, a flat, rectangular plate, a pivot supporting one end of the plate on a horizontal axis, a pair of flanges rising from the plate at right angles to said horizontal axis and immediately adjacent the pivot, and a winch drum revolvable in the flanges above the plate mounted parallel to the said its axis, the flanges being disconnected to leave the upper half of the winch drum substantially unobstructed and the pivot being in the form of a straight pin confining the plate to swinging movement in a single transverse plane.

References Cited in the file of this patent

UNITED STATES PATENTS

| Number | Name | Date |
|---|---|---|
| 772,157 | Koehler | Oct. 11, 1904 |
| 934,012 | Pool | Sept. 14, 1909 |
| 2,012,040 | Ellis | Aug. 20, 1935 |
| 2,159,848 | Gibbons | Mar. 23, 1939 |
| 2,198,844 | Smith | Apr. 30, 1940 |
| 2,348,487 | McKay et al. | May 9, 1944 |
| 2,464,832 | Stuart | Mar. 22, 1949 |
| 2,499,753 | Hubbard | Mar. 7, 1950 |
| 2,623,762 | Fornelius | Dec. 30, 1952 |